Figure 1:
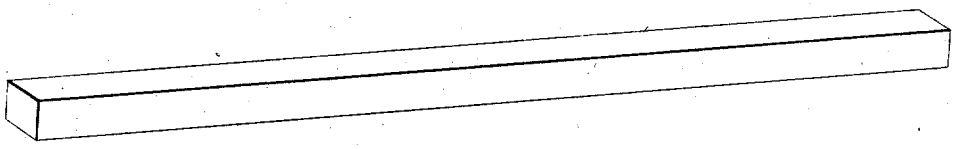

C. F. BRUSH.

ILLUMINATING POINT FOR ELECTRIC LIGHTS.

No. 10,544.

Reissued Dec. 23, 1884.

WITNESSES

S. G. Nottingham

W. A. Ruff

INVENTOR

Chas. F. Brush.

By Leggett & Leggett

ATTORNEY

UNITED STATES PATENT OFFICE.

CHARLES F. BRUSH, OF CLEVELAND, OHIO.

ILLUMINATING-POINT FOR ELECTRIC LIGHTS.

SPECIFICATION forming part of Reissued Letters Patent No. 10,544, dated December 23, 1884.

Original No. 196,425, dated October 23, 1877. Application for reissue filed November 21, 1884.

*To all whom it may concern:*

Be it known that I, CHARLES F. BRUSH, of Cleveland, in the county of Cuyahoga and State of Ohio, have invented certain new and useful Improvements in Illuminating-Points for Electric Lights; and I do hereby declare the following to be a full, clear, and exact description of the invention, such as will enable others skilled in the art to which it pertains to make and use it, reference being had to the accompanying drawings.

My invention relates to the carbons or illuminating-points of electrical lighting apparatus.

I am informed that in certain foreign patents granted prior to my original application there is disclosed the idea or suggestion of providing an electric-light carbon with a metallic coating or covering or envelope, and hence brief mention will be made of such patents as are representative of the prior art. French patent granted to Carré, June 8, 1868, as an addition to Carré's original patent granted in 1867, describes an improvement in artificial carbons consisting of an agglomeration of different materials, and contains the suggestion that to secure long solid and conducting carbons they may be galvanized with a coating of readily-fusible or volatile metals—such as zinc and tin. French Patent No. 109,895 and its two additions, granted to Reynier, December 11, 1875, December 10, 1876, and April 6, 1877, respectively, describe carbons for electric lights coated or covered by an envelope or sheathing of refractory metal—such as platinum, palladium, iridium, gold, silver, copper, nickel, cobalt, chromium, iron, manganese, &c.—for the purpose of preventing the too rapid consumption of the carbon, the covering to be applied by galvanic deposition, by precipitation, by molding, or in any way desired. Carbons made in accordance with the description or suggestions contained in the Carré patent would be objectionable and impracticable in operation, because to impart solidity to a rod composed of an agglomeration of different materials by a coating or covering of readily-fusible or volatile metals—such as zinc and tin—would necessitate a coating or covering of such thickness of the readily-fusible metal or alloy that it would so interfere with the operation of the arc by the introduction of the fused metal into it, and with the use of the arc by the fumes of the oxidized metal dissipated therefrom, as to preclude their use. Again, the extreme fusibility of such a coating or covering would cause it to melt off from the electrode too readily for it to afford any adequate protection to the same. An electrode made in accordance with the description or suggestions found in Reynier's patent would be defective and impracticable for electric lighting purposes, because, in addition to other reasons, it would be a compound electrode consisting of carbon and metal at the arc, and to prolong the life of the electrode by the employment of the refractory metal coating or covering, as specified in the patent, would necessitate the use of either such a very highly refractory metal or such an amount of less refractory metal as would be detrimental to the operation or character of the arc.

The object of my invention is to avoid the defects and objectionable features hereinbefore set forth; and with this end in view my invention consists in carbons or illuminating-points for electric lights electroplated with copper, substantially as described and claimed.

Figure 2:
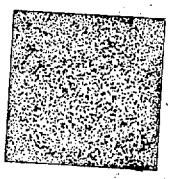

In the accompanying drawings, Figure 1 is a view in perspective of the copper electroplated carbon deposited in the Patent Office as a model in the application for the original patent, and Fig. 2 is an enlarged view in cross-section of the same, illustrating the relative thickness of the carbon stick and its coating, the model having a cross-section one-quarter of an inch square, and having the coating which I have found well adapted for carrying out my invention. In this figure the carbon is represented by dots or stippling, while the fine line encircling the carbon represents the thin film of electro-deposited copper constituting the metal coating.

I have found, by repeated experiment with a powerful dynamo-electric apparatus, that it is impracticable to employ sufficiently thin carbon sticks to produce the best illuminating effects, on account of their high resistance and rapid consumption, due to the action of the air on the highly-heated carbon. A great amount of heat is generated in small carbons in consequence of their resistance, aside from the heat produced at the ends by the voltaic arc.

As it is always desirable to employ carbon points as small or thin as possible, I have sought to provide a means whereby such may be practically used in connection with a powerful electric current, and I have fully accomplished my purpose by covering the carbon stick with copper. The main objects of this covering are to decrease the resistance of the carbon, and protect it from the action of the air, excepting at the extreme illuminating end. I electroplate the carbons with copper.

Providing the covering to the carbons as above specified, results, first, in preventing consumption of the carbons, excepting at and very near their points; second, in the practicability of using smaller or thinner carbon sticks; third, in the ability to employ much longer sticks; fourth, in affording a free and ready conductor to the electric current, thus sufficiently decreasing the resistance to said current that has heretofore rendered the employment of small carbons impracticable; fifth, insuring a good electric connection between the carbon stick and its port; sixth, in making practicable the employment of foreign matter mixed with the carbon. In operation the intense heat generated by the electric light melts and disperses the covering of the carbon sticks at their opposing points and for a proper distance beyond, but no farther. The balance of the carbons are entirely preserved, while as fast as the carbons are burned just so fast will their covering be removed, leaving the carbons properly exposed.

I do not confine myself to the covering of pure carbon only. A mixture of carbon with foreign material may be used. Thus the carbon may be mixed with any other suitable substance for increasing the illuminating-power of the incandescent points—such as, for instance, magnesia, lime, &c.

As I am not aware that carbons have ever before been provided with the covering hereinbefore specified,

What I claim is—

As an article of manufacture, a carbon stick having an electroplated coating of copper deposited thereon in such limited quantity or thickness as to serve as an electro conducting and protecting covering, and at the same time to be dispersed by the generated heat at and for a proper distance beyond the point and no farther, substantially as shown and described.

In testimony whereof I affix my signature in presence of two witnesses.

CHARLES F. BRUSH.

Witnesses:

L. B. LEVAKE,

E. B. BAUDER.